United States Patent
Vance et al.

(10) Patent No.: US 11,982,995 B2
(45) Date of Patent: *May 14, 2024

(54) DEFECT DETECTION DURING AN AUTOMATED PRODUCTION PROCESS

(71) Applicant: Rockwell Automation Technologies, Inc., Mayfield Heights, OH (US)

(72) Inventors: Gregory J. Vance, Brunswick, OH (US); Robert F. Trinnes, Solon, OH (US); Mikica Cvijetinovic, North Royalton, OH (US); Francisco P. Maturana, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/703,325

(22) Filed: Mar. 24, 2022

(65) Prior Publication Data
US 2022/0283566 A1  Sep. 8, 2022

Related U.S. Application Data

(63) Continuation of application No. 16/419,923, filed on May 22, 2019, now Pat. No. 11,287,807.

(51) Int. Cl.
*G05B 19/418* (2006.01)
*G05B 11/01* (2006.01)

(52) U.S. Cl.
CPC ............ *G05B 19/418* (2013.01); *G05B 11/01* (2013.01); *G05B 2219/31304* (2013.01)

(58) Field of Classification Search
CPC .................. G05B 19/418; G05B 11/01; G05B 2219/31304; G05B 2219/32197; G05B 23/0275; G05B 19/41875; G05B 23/0289
See application file for complete search history.

(56) References Cited

U.S. PATENT DOCUMENTS

| | | |
|---|---|---|
| 2002/0181757 A1 | 12/2002 | Takeuchi |
| 2009/0070994 A1 | 3/2009 | Miyakawa et al. |
| 2011/0249111 A1 | 10/2011 | Weiss et al. |
| 2012/0235179 A1 | 9/2012 | Hiroki |

*Primary Examiner* — Tejal Gami

(57) ABSTRACT

Described herein are systems and methods for improving defect detection in an automated production process. The system comprises a memory that stores executable components and a processor, operatively coupled to the memory, that executes the executable components. The executable components comprise an automation defect component and a machine learning component. The automation defect component retrieves parametric data associated with the production process. The automation defect component provides the parametric data to a machine learning algorithm. The machine learning component generates common attributes between the defective items. The machine learning component identifies a set of common attributes shared between the defective items and a non-defective item. The machine learning component modifies the set of the common attributes shared between the defective items and the non-defective item. The machine learning component generates defect indicators based on the common attributes. The automation defect component monitors subsequent parametric data to recognize the defect indicators.

20 Claims, 9 Drawing Sheets

| ITEM | PARAMETRIC DATA 522 ||||| |
|---|---|---|---|---|---|
| | STG. 332 | STG. 333 | STG. 334 | STG. 335 | DEFECT? |
| 401 | 3.9 units | 56.2 units | 303 units | 8.0 units | YES |
| 501 | 4.8 units | 60.8 units | 304 units | 7.5 units | NO |
| 502 | 4.2 units | 53.3 units | 298 units | 7.7 units | NO |
| 503 | 5.8 units | 55.0 units | 305 units | 8.4 units | YES |
| 504 | 3.5 units | 56.2 units | 304 units | 7.7 units | YES |
| 505 | 4.0 units | 56.2 units | 305 units | 8.1 units | NO |

| DEFECT INDICATORS 523 |
|---|
| 511: 305 units at stage 334 AND >8.1 units at stage 335 |
| 512: 56.2 units at stage 333 AND <4.0 units at stage 332 |

FIGURE 5

DEFECT DETECTION DURING AN AUTOMATED PRODUCTION PROCESS

RELATED APPLICATIONS

This application claims the benefit of and priority to U.S. patent application Ser. No. 16/419,923 entitled, "IMPROVED DEFECT DETECTION DURING AN AUTOMATED PRODUCTION PROCESS" which was filed on May 5, 2019, which claims the benefit of and priority to U.S. Provisional Application No. 62/760,663, entitled "IMPROVED DEFECT DETECTION DURING AN AUTOMATED PRODUCTION PROCESS," filed Nov. 13, 2018. The entire disclosures of the above applications are incorporated herein by reference.

TECHNICAL BACKGROUND

Automated item production processes (e.g., manufacturing/assembly processes) may include multiple stages that each perform a designated operation that result in a completed item upon completion of a final stage. For example, one stage may place a component of an item and then a next stage may attach the component to the item in that place. At each stage, it is possible that one or more defects may be introduced into the item. In the above example, the component may not be placed correctly at the placement stage or the component may not be attached correctly at the attachment stage. Typically, the earlier a defect is detected, the easy and/or more cost-effective correcting that defect will be. For instance, an incorrect placement of the component from above may affect the placement of additional components in later stages. If the initial defect was caught before those other components are also placed incorrectly, then it will be easier to fix the one component before allowing the item to continue to the subsequent stages.

OVERVIEW

Described herein are systems and methods for identifying defects during automated item production. In one example, a system is configured to improve defect detection in a production process. The system comprises a memory that stores executable components and a processor operatively coupled to the memory that executes the executable components. The executable components comprise an automation defect component and a machine learning component. The automation defect component retrieves parametric data associated with multiple stages of the production process. The parametric data indicates defective items associated with the multiple stages of the production process. The automation defect component provides the parametric data to a machine learning algorithm. The machine learning component generates, as output from the machine learning algorithm, common attributes between the defective items indicated by the parametric data. The machine learning component identifies a set of the common attributes shared between the defective items is also shared with non-defective items. The machine learning component modifies the set of common attributes shared between the defective items and the non-defective items. The modification ensures that the set of the common attributes is not shared between the defective items and the non-defective items. The machine learning component generates defect indicators based on the common attributes which now include the modified set of common attributes. The automation defect component monitors subsequent parametric data associated with the stages of the production process to recognize the defect indicators.

In some embodiments, the common attributes comprise measurements, measurement combinations, thresholds, measurement descriptions and the like. The machine learning component may generate the common attributes by determining the measurements, measurement combinations, thresholds, and measurement descriptions for the defective items. The machine learning component may identify the set of the common attributes shared between the defective items and the non-defective items based on measurements, measurement combinations, thresholds, and measurement descriptions, or some other descriptive criteria shared between the defective and non-defective items. The machine learning component may modify the set of attributes shared between the defective items and the non-defective items by modifying the measurements, measurement combinations, thresholds, and measurement descriptions.

In some embodiments, the machine learning component may generate the defect indicators by combining two of more of the common attributes into a single defect indicator. The machine learning component may determine a confidence level that indicates one or more of the defect indicators represents a defective item. The machine learning component may determine a threshold level indicating a minimum number of the defective items to which an attribute applies before the attribute can be included in a defect indicator. The machine learning component may determine common attributes that affect other common attributes to generate defect indicators. Likewise, the machine learning component may determine common attributes that cannot affect other common attributes to generate the defect indicators.

In some embodiments, a method for improving defect detection in a production process is disclosed. In some embodiments, a non-transitory computer-readable medium having stored thereon instructions for improving defect detection in an automated production process is disclosed.

BRIEF DESCRIPTION OF THE DRAWINGS

FIG. 5 illustrates exemplary parametric data and defect indicators for identifying defects during automated item production.

DETAILED DESCRIPTION

When a stage of an automated item production process performs its designated task, parametric data is collected about the performance of that task. The parametric data indicates one or more measured values that can be captured by the automated production component(s) performing the operations for the stage. These measured values are used to detect a defect caused by the stage of the process even if the values are within the tolerance thresholds of the stage's operation. That is, measured values that fall outside of the tolerance thresholds may indicate that a defect may have occurred at the step and are easy to recognize. However, it is possible that a defect is created even when the measured values of the parametric data are within the tolerance thresholds. Since the tolerance thresholds would not be triggered in such a situation, the defect may not be recognized until later on in the production process or maybe even once the item is in use by a customer. The parametric data is used herein to identify defects despite the measured values falling within tolerance thresholds. This allows a defect to be recognized before the item is passed to the next stage in the production process (i.e., in substantially real-time during the process), which minimizes any correction needed to account for the defect.

Figure 1:
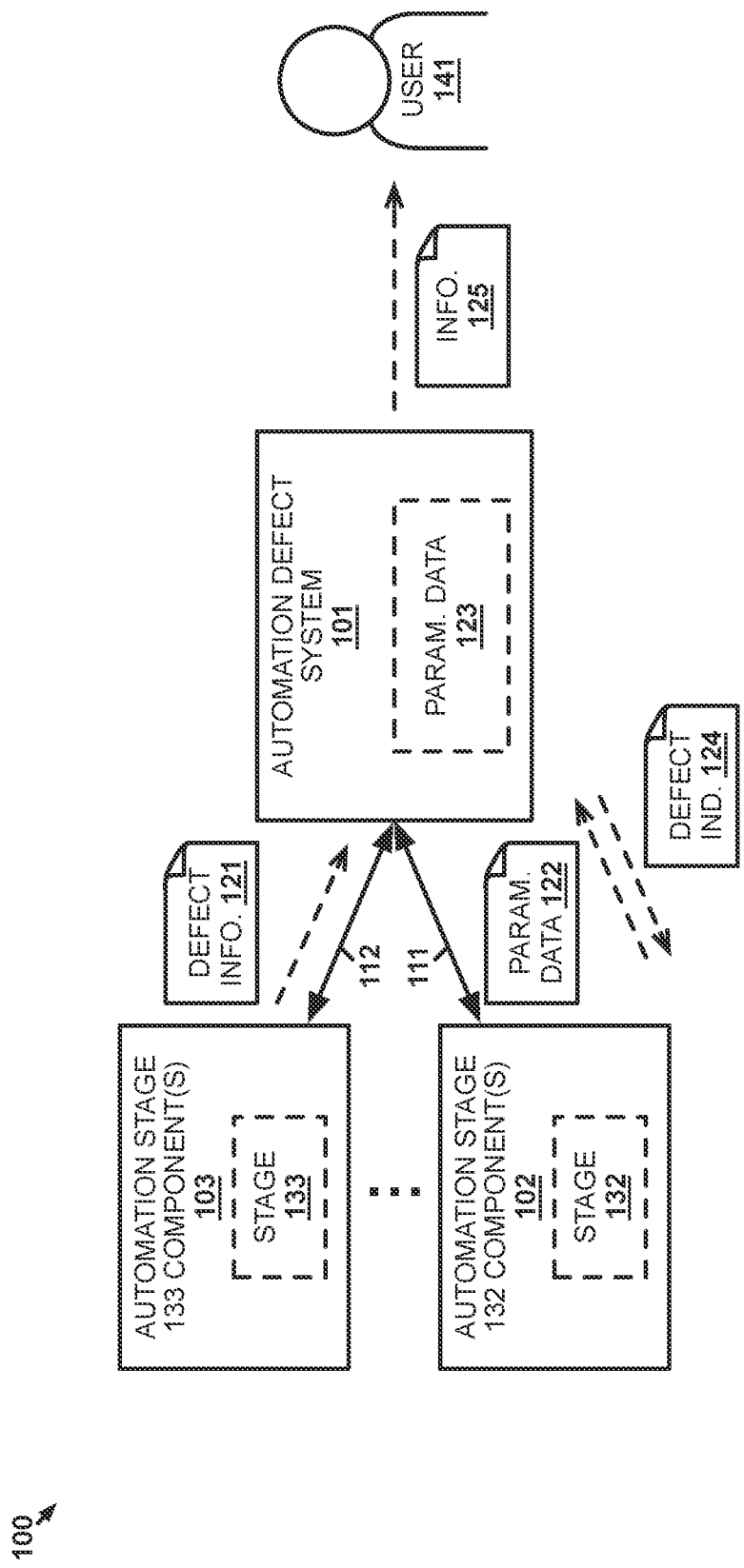
FIG. 1 illustrates an example implementation for identifying defects during automated item production.

FIG. 1 illustrates implementation 100 for identifying defects during automated item production. Implementation 100 includes automation defect system 101, automation stage 132 component(s) 102, and automation stage 133 component(s) 103. Stage 132 and stage 133, performed by respective automation stage 132 component(s) 102 and automation stage 133 component(s) 103, are two of what could be many more stages of an item production process. Those additional stages may come before, after, and/or between stage 132 and stage 133 and are performed by their own respective automation stage components. In this example, stage 132 is performed before stage 133. Each of automation stage 132 component(s) 102 and automation stage 133 component(s) 103 may include nozzles, heads, drive motors, arms, belts, control circuitry, or any other type of component that could perform an operation in an item production process including combinations thereof. Automation defect system 101 and automation stage 132 component(s) 102 communicate over communication link 111. Automation defect system 101 and automation stage 133 component(s) 103 communicate over communication link 112. Communication links 111-112 may be direct links or may include one or more intervening systems, networks, and/or devices.

Figure 2:
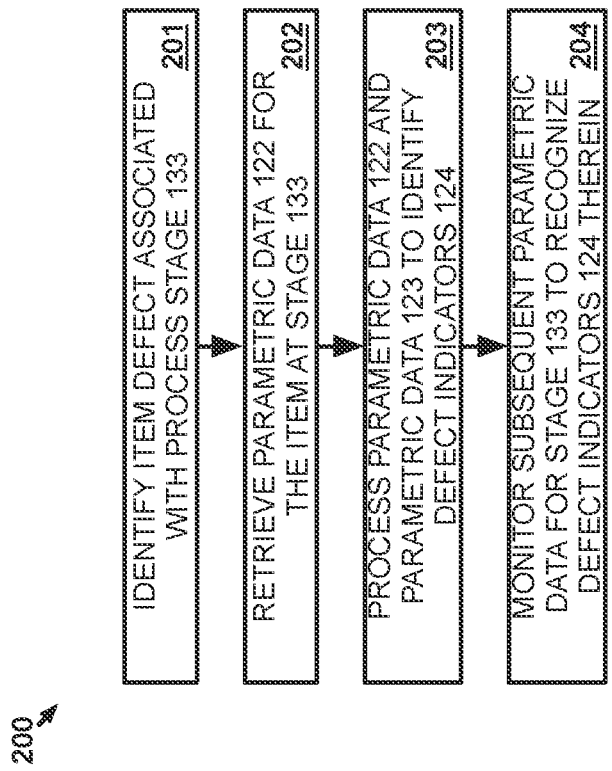
FIG. 2 illustrates an operational scenario for identifying defects during automated item production.

FIG. 2 illustrates operational scenario 200 for identifying defects during automated item production. In operational scenario 200, automation defect system 101 identifies a defect in an item being produced by the automated production process having stage 132 and stage 133 (201). In this example, automation defect system 101 identifies the defect by receiving defect information 121 from automation stage 133 component(s) 103. In this example, defect information 121 includes any information that automation defect system 101 may need to identify that the defect was caused at stage 132 and to identify the item in which the defect was found. For example, the item may have a unique identifier to track the item's progress through the automated production process, which may be included in defect information 121. Likewise, stage 132 may be identified explicitly through an identifier for stage 132 or may identify a component (e.g., microchip) of the item (e.g., processing board) that is causing the item to be defective and rely on automation defect system 101 to determine that stage 132 is associated with that component. Stage 133 may identify the defect due to stage 133 involving, at least in part, an item testing/inspection operation to ensure the item has been assembled properly up to that point (e.g., an optical inspector that measures aspects of the item resulting from stage 133). The testing/inspection of stage 132's results may also occur in stage 132 itself or in another testing/inspection step, which may not be considered a production step. In other examples, human testers, including end customers of the item, may be the ones to identify the item defect to automation defect system 101 using information similar to defect information 121.

Upon receiving defect information 121, automation defect system 101 retrieves parametric data 122, which is associated with stage 132 for the item (202). As noted above, parametric data includes measured values taken from when an item was going through an operation of the process stage. In this case, parametric data 122 indicates one or more measured values from when automation stage 132 component(s) 102 were operating on the item to complete stage 132. For instance, if automation stage 132 component(s) 102 apply solder paste to the item at stage 132, parametric data 122 may indicate a volume of solder paste applied to various locations on the item, the area covered by the solder paste at each location, the height of the solder paste from the surface at each location, or other quantifiable value—including combinations thereof. Parametric data 122 may be received by automation defect system 101 from automation stage 132 component(s) 102 after receiving defect information 121 or may be received at some other time, such as periodically or after the values for each item passing through stage 132 are measured. As such, retrieving parametric data 122 may comprise automation defect system 101 accessing a data storage component, either internal or external, that stores parametric data 122.

Automation defect system 101 processes parametric data 122, along with additional parametric data 123 to identify one or more defect indicators 124 (203). Parametric data 123 includes parametric data retrieved by automation defect system 101 for other items that had defects identified to have been caused by stage 132. A machine learning algorithm (or other type of similarly capable artificial intelligence) may be used by automation defect system 101 to determine commonalities and/or patterns that exist in the parametric data, including commonalities/patterns across values, for items having defects caused at stage 132. Parametric data 123 in some examples may also include parametric data for items that did not include defects from stage 132, so automation defect system 101 can use that parametric data as a control to make sure an identified commonality/pattern is not also a characteristic of items without defects caused at stage 132. In further examples, parametric data 123 may include parametric data from other stages of the automated production process for the defective items. In those examples, automation defect system 101 may identify commonalities/patterns across stages just in case a defect, which was seemingly caused at stage 132, was also affected by another stage. By identifying commonalities/patterns in parametric data, automation defect system 101 is able to identify defect indicators 124 in measured values that fall within operational tolerances and would not otherwise indicate a defect on their own. For example, automation defect system 101 may determine that value A is greater than X and value B is less than Y every time (or above a threshold percentage of times) a defect in an item is identified to have occurred at stage 132. Value A being greater than X and value B being less than Y would then be included in defect indicator(s) 124 to indicate that a defect is likely to have occurred at stage 132. Thus, even if value A and value B were still within tolerance thresholds, the combination of A being greater than X and B being less than Y would still indicate a defect.

Defect indicator(s) 124 are then used to monitor subsequent parametric data associated with stage 132 to recognize defect indicator(s) 124 in subsequent parametric data measured for subsequent items. To monitor the subsequent parametric data, automation defect system 101 may transfer defect indicator(s) 124 to automation stage 132 component(s) 102. Automation stage 132 component(s) 102 can then recognize whether measured values satisfy any of defect indicator(s) 124. For example, a testing/inspection component may be provided with defect indicator(s) 124 to recognize defects using defect indicator(s) 124 during testing/inspection. If one of defect indicator(s) 124 is recognized in the measured values for an item, then automation stage 132 component(s) 102 can flag the item as defective before passing the item along to a subsequent stage. Over time, automation defect system 101 may continue to update defect indicator(s) 124 based on additional defective items that are identified either through defect indicator(s) 124 or later on (e.g., at stage 133). Defect indicator(s) 124 therefore improve defect detection by allowing defects to be identified based on values measured during operation at a production stage and without having to actually inspect or test an item for defects. Moreover, defect indicator(s) 124 may be used as a basis for adjusting settings or components of automation stage 132 component(s) 102 (either automatically or with a user interaction, including replacing components) to prevent or reduce the number of defects caused at stage 132 in the future.

In some examples, automation defect system 101 may provide information to user 141 about defect indicator(s) 124. This allows user 141 to be aware of issues in the automatic production process and potentially take corrective action if automation stage 132 component(s) 102 are not configured to automatically correct for defect indicator(s) 124. Automation defect system 101 may include a user interface to directly present to user 141 (e.g., display or audibly present information 125) or automation defect system 101 may present information 125 to user 141 via another system, such as a user device operated by user 141, to which information 125 is transferred.

While the above example appears to show automation defect system 101 implemented in a single device, it should be understood that automation defect system 101 may be distributed across multiple devices and may be included in devices having other functionality, such as a control system for the automated production process. In some examples, automation defect system 101 may be implemented at least partially using a cloud computing service.

Figure 3:
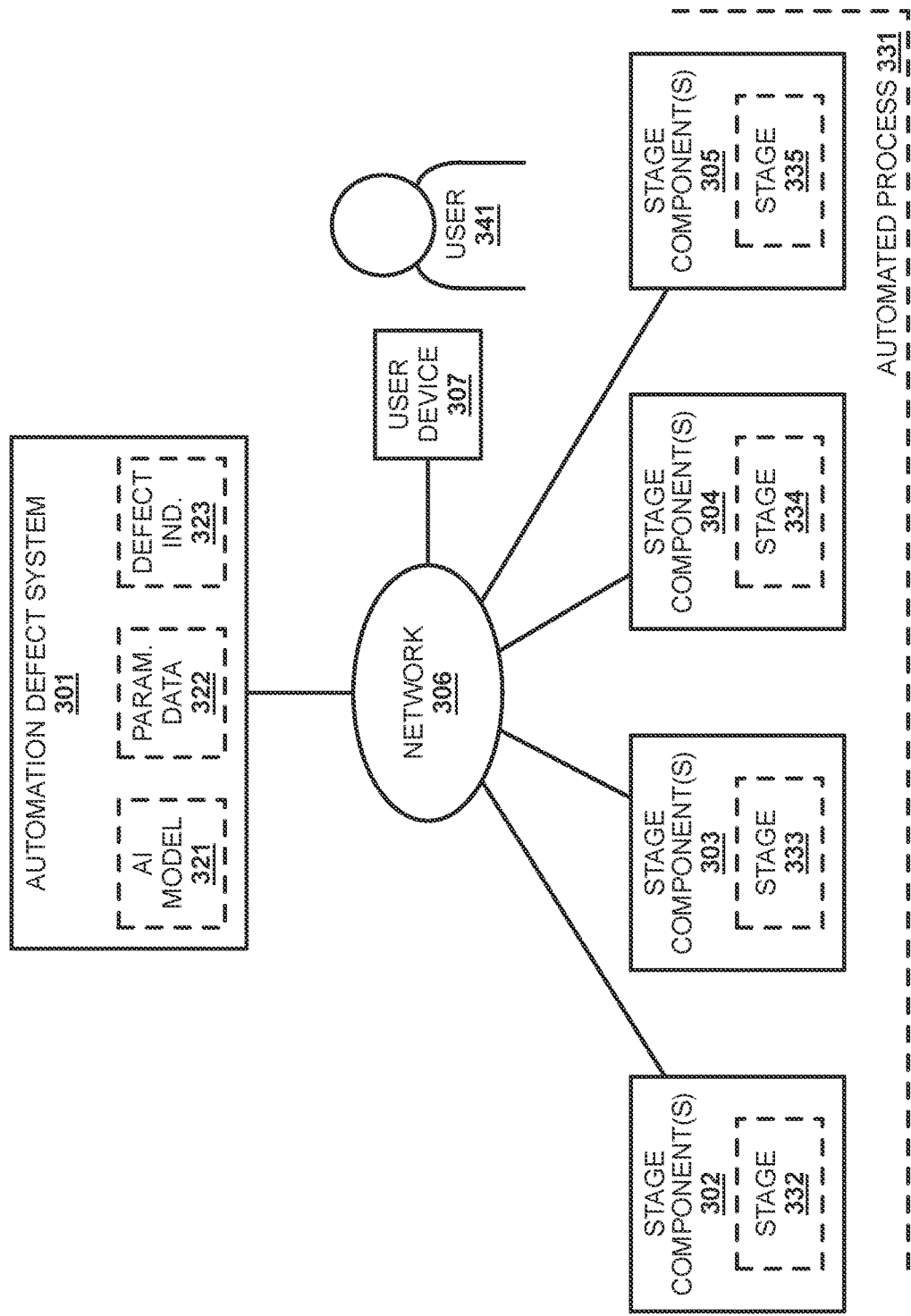
FIG. 3 illustrates an example implementation for identifying defects during automated item production.

FIG. 3 illustrates implementation 300 for identifying defects during automated item production. Implementation 300 includes automation defect system 301, automation stage components 302, automation stage components 303, automation stage components 304, automation stage components 305, network 306, and user device 307. Automation stage components 302, automation stage components 303, automation stage components 304, and automation stage components 305 when operating together perform respective stages 332, 333, 334, and 335 of automated process 331. Network 306 may comprise a single communication network, such as a local area network (LAN), or may include multiple networks, such as multiple LANs and/or a wide area network (WAN) like the Internet, over which communications are transferred between automation defect system 301, automation stage components 302, automation stage components 303, automation stage components 304, automation stage components 305, and user device 307. In some examples, one or more of automation stage components 302, automation stage components 303, automation stage components 304 and automation stage components 305 may be connected to a process control system for automated process 331, which in turn connects to network 306, rather than being directly connected to network 306, as shown. Communications over network 306 allow automation defect system 301 to be a local system to automated process 331 or to be remote system, such as a cloud service system, for automated process 331 and potentially other automated processes.

In operation, automated process 331 produces items in stages 332, 333, 334, and 335, where each stage performs one or more tasks towards producing a final item. While not shown, automated process 331 may include additional stages, which are performed by additional components, that are not shown in this example. Automation defect system 301 uses parametric data 322 received from automation stage components 302, automation stage components 303, automation stage components 304, and automation stage components 305 during operation to learn attributes that indicate an item is defective. Those attributes are used in defect indicators 323 by automation defect system 301 to identify other defective items in automated process 331. In this example, user 341 interacts with automation defect system 301 via user device 307. User device 307 may be a personal computer, tablet computer, smartphone, or some other user operable device that communicates over network 306. It should be understood that, while the discussion below describes elements such as AI model 321 and stages 332-335 as performing tasks, it is actually the systems and devices associated therewith that are performing the functions (e.g., AI model 321 executes on and directs automation defect system 301 to perform as described below and automation stage components 304 implement stage 334).

Figure 4:
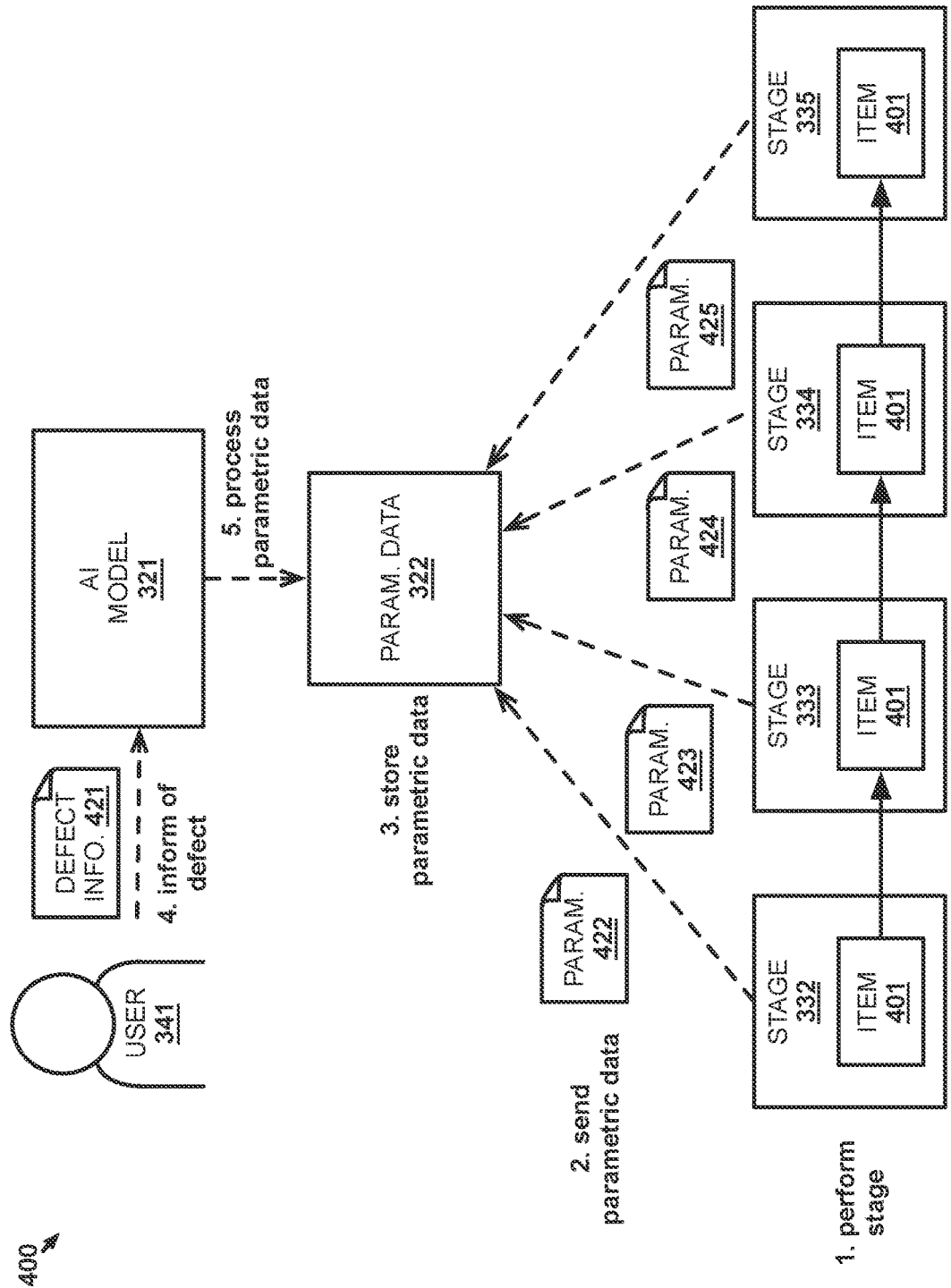
FIG. 4 illustrates an operational scenario for identifying defects during automated item production.

FIG. 4 illustrates operational scenario 400 for identifying defects during automated item production. Operational scenario 400 follows the production of item 401 through stage 332, stage 333, stage 334, and stage 335. Item 401 is first operated on by stage 332 at step 1. Upon completion of stage 332, parametric data 422 is transferred by automation stage components 302 to automation defect system 301 at step 2 for storage with parametric data 322 at step 3. Steps 1-3 then repeat themselves three more times as item 401 is operated on at stage 333, then stage 334, and then stage 335. Upon completion of all stages, stage 332 now includes parametric data 422, parametric data 423, parametric data 424, and parametric data 425 for item 401. Parametric data 422 further includes parametric data for other items, both defective and non-defective, that went through stage 332, stage 333, stage 334, and stage 335.

In this example, user 341 operates user device 307 to provide defect information 421 to Artificial Intelligence (AI) model 321 executing on automation defect system 301. Defect information 421 indicates to AI model 321 that a defect occurred in item 401 that was caused by stage 332, stage 333, stage 334, and/or stage 335 even though the measurements in parametric data 422, parametric data 423, parametric data 424, and parametric data 425 were otherwise within acceptable tolerances. AI model 321 is configured to process parametric data 322 at step 5 to recognize commonalities/patterns of attributes in parametric data for defective items, which now includes parametric data 422-425, that are not present in parametric data for non-defective items. Those attributes are then added to defect indicators 323 by AI model 321 so that future defective items can be identified using defect indicators 323. As more parametric data is added to parametric data 322 for both defective and non-defective items, AI model 321 will be able to further hone defect indicators 323 through machine learning thanks to having a larger sample size. It should be understood that AI model 321 may be able to recognize commonalities and patterns that are far more complex than those described in the specific examples herein.

In some examples, one or more of the attributes may be shared with one or more non-defective items. For instance, AI model 321 may determine that, of all the items that share a particular attribute, a high percentage are defective (e.g., 97%). AI model 321 may use a threshold (e.g., greater than 95% defective) to determine that the attribute should still be included in a defect indicator since there is only a small chance that an item having the attribute will not be defective. The example attribute above would, therefore, be used for a defect indicator since 97% defective is greater than the 95% defective threshold.

FIG. 5 illustrates parametric data 522 and defect indicators 523 for identifying defects during automated item production. Parametric data 522 is an example of parametric data 322 and defect indicators 523 are examples of defect indicators 323. Parametric data 522 includes measurements included in parametric data for items 401 and 501-505 from each of stages 332-335. For example, the measurements for item 401 at each of stages 332-335 may have been included in parametric data 422, parametric data 423, parametric data 424, and parametric data 425, respectively, in operational scenario 400. Similarly, the measurements for items 501-505 may have been added to parametric data 522 upon each of items 501-505 passing through stages 332-335 in a manner similar to item 401 in operational scenario 400.

Each measurement shown in parametric data 522 has generic units but could use any unit of measurement depending on what is performed by a respective stage. For example, the units of one stage may be time units (e.g., seconds) while another stage may be volume units (e.g., milliliters) and another stage is length (e.g., millimeters). While only one measurement is included for each stage in parametric data 522, it should be understood that parametric data 522 could include multiple measurements for one or more of the stages, with those multiple measurements possibly having different units. Since each stage may perform multiple operations, or compound operations, on an item, multiple measurements may be appropriate to check that each operation, or portion of an operation, was performed properly.

Defect indicators 523 include defect indicator 511 and defect indicator 512 that define measurements that AI model 321 has determined correspond to defective items. In this example, defect indicators 523 are defined using boolean logic although other definition types may be used in other examples.

Figure 6:
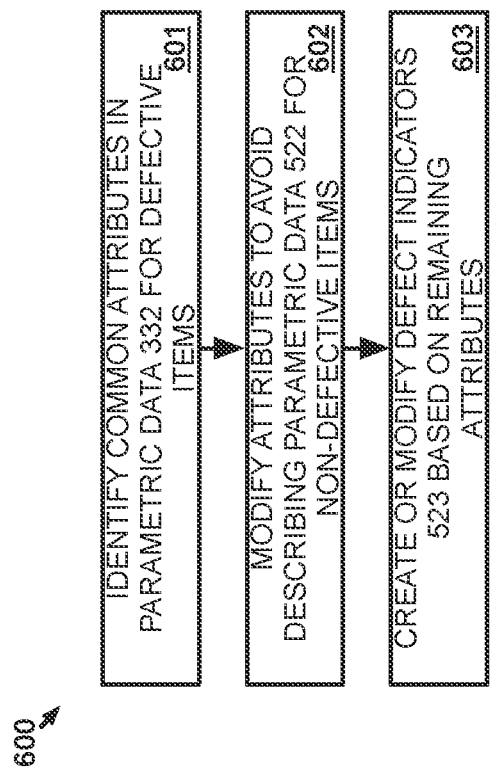
FIG. 6 illustrates an operational scenario for identifying defects during automated item production.

FIG. 6 illustrates operational scenario 600 for identifying defects during automated item production. Operational scenario 600 describes an example for how AI model 321 may determine defect indicators 523 from parametric data 522. AI model 321 identifies common attributes between defective items of parametric data 522 (601). In this example, parametric data 522 indicates that item 401, item 503, and item 504 are defective due to something that occurred during stages 332-335. Thus, AI model 321 determines which attributes are common between two or more of item 401, item 503, and item 504. An attribute for a defective item may include a single measurement or may be a combination of measurements. Likewise, an attribute may include a description of one or more of the measurements for an item. For instance, an attribute of item 401 may be that item 401 has less than 4.1 units at stage 332 and greater than 7.5 units at stage 335.

To help ensure that non-defective items do not also include similar attributes, AI model 321 modifies any attributes that also describe non-defective items in parametric data 522 (602). In this case, item 501, item 502, and item 505 are not defective, so AI model 321 references the measurements of those items. Using the attribute of item 401 from above (i.e., less than 4.1 units at stage 332 and greater than 7.5 units at stage 335), that attribute would be modified by AI model 321 since item 505, which is not defective, also measured less that 4.1 units at stage 332 and greater than 7.5 at stage 335. In that case, AI model 321 may modify the attribute to indicate that item 401 has less than 4.0 units at stage 332. Since no non-defective items measured less than 4.0 at stage 332, then AI model 321 will use the attribute that indicates less than 4.0 at stage 332 and greater than 7.5 units at stage 335 for determining defect indicators 523.

Once AI model 321 has determined that the attributes AI model 321 identified for defective items 401, 503, and 504 do not also describe any of the non-defective items, AI model 321 creates one or more defect indicators 523 using the attributes (603). AI model 321 may use each determined attribute individually as a defect indicator or may combine two or more of the attributes into a single defect indicator, either newly created or combined into an existing defect indicator. AI model 321 may include logic for determining which attributes should be incorporated into a defect indicator. The logic may include indicators of confidence that an attribute truly represents a defective item. For instance, the logic may include a threshold indicating a minimum number of defective items to which an attribute applies before the attribute can be included in a defect indicator. The logic may also indicate to AI model 321 which measurements are likely to affect other measurements. For example, it may be physically impossible for stage 332 to effect or be affected by stage 335. Therefore, AI model 321 would not include an attribute concerning those two stages, such as the example attribute discussed above, in defect indicators 523 (although, such rules for AI model 321 may be avoided to avoid incorrectly defining an impossible situation). Other decision logic may also be used or may be determined by AI model 321 itself as it learns more from parametric data for additional items going through automated process 331.

Figure 7:
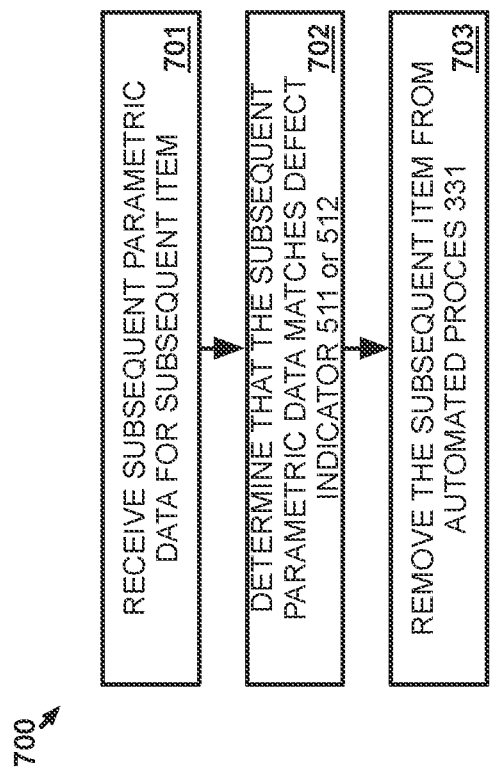
FIG. 7 illustrates an operational scenario for identifying defects during automated item production.

FIG. 7 illustrates operational scenario 700 for identifying defects during automated item production. Operational scenario 700 is an example of how defect indicators 523 may be used to recognize defective items going through automated process 331. As a subsequent item passes through stages 332-335 of automated process 331, subsequent parametric data measured for the subsequent item is passed to automation defect system 301 in a manner similar to that of steps 1 and 2 of operational scenario 400 (701). AI model 321 analyzes the subsequent parametric data to determine whether the measurements carried therein satisfy any of defect indicators 523 (i.e., defect indicator 511 or defect indicator 512) (702). That is, AI model 321 determines whether the subsequent parametric data indicates 305 units at stage 334 and greater than 8.1 units at stage 335 for the subsequent item, and also determines whether the subsequent parametric data indicates 56.2 units at stage 333 and less than 4.0 units at stage 332 for the subsequent item. If AI model 321 determines that a defect indicator is satisfied, then AI model 321 may be configured to stop comparing the subsequent parametric data to those defect indicators that have not yet be checked, which reduces processing especially in situations where there are a large number of defect indicators to check. In other cases, AI model 321 may continue to compare the subsequent parametric data to at least some of the remaining defect indicators. In those cases, matches to more than one defect indicator may increase the confidence of AI model 321 that the subsequent item is defective or may indicate increased severity of the defect(s) in the subsequent item. Similarly, in some examples, different weights may be given to different defect indicators. For example, AI model 321 may be provided with information from user 341 about the severity of a defect when being notified of a defective item (e.g., one defect may be one that is easily fixable to salvage an item while another defect may result in having to scrap the defective item).

Upon determining that one or more of defect indicators 532 match the subsequent parametric data, AI model 321 removes subsequent item from automated process 331 (703). AI model 321 may remove the subsequent item from automated process 331 by directing a component further down in automated process 331 to reject the subsequent item from the production path. In another example, AI model 321 may transfer a notification to user device 307, or another interested user's user device, to notify user 341 (or the other interested user) that the subsequent item is defective. The user can then manually pull the subsequent item from production either mid automated process 331 or at some other point before the subsequent item reaches a customer (or other potentially effected party), or may determine to handle the situation in some other manner. In some cases, the user notification may indicate information beyond the fact that AI model 321 has determined the subsequent item to be defective. For example, AI model 321 may indicate a severity of a defect (e.g., based on how many defect indicators matched the subsequent parametric data and/or the weight of the defect indicator(s) that matched), may indicate which stage(s) likely caused the defect (e.g., matching defect indicator 511 may indicate to AI model 321 that stage 334 and 335 caused the defect), may indicate specific measurements that caused the match to a defect indicator, or may provide some other information that AI model 321 may learn from the parametric data including combinations thereof. Additional information may help the user in their decision-making process about how to handle the subsequent item.

AI model 321 may automatically add the subsequent parametric data to parametric data 522 to further refine defect indicators 523 or may wait for confirmation from a user indicating that the subsequent item is, in fact, defective before potentially including parametric data that could incorrectly skew AI model 321's analysis. Even in examples where subsequent parametric data does not match any of defect indicators 523, AI model 321 may wait to include the subsequent parametric data therein until either a confirmation is received indicating that the subsequent item is not defective or a predetermined period of time has elapsed since receiving the subsequent parametric data without AI model 321 being notified that the subsequent data was defective.

In operational scenario 700, AI model 321 is charged with identifying defective items using defect indicators 523. In other examples, AI model 321 may determine defect indicators 523 and then transfer them to another component of automation defect system 301 or another monitoring system. For instance, automation defect system 301 may be a cloud based system that uses AI model 321 to create defect indicators 522 for automated process 331. Another system local to automated process 331, such as a process control system, may receive defect indicators 523 from AI model 321 and then monitor items passing through automated process 331 for defects indicated by defect indicators 523.

Figure 8:
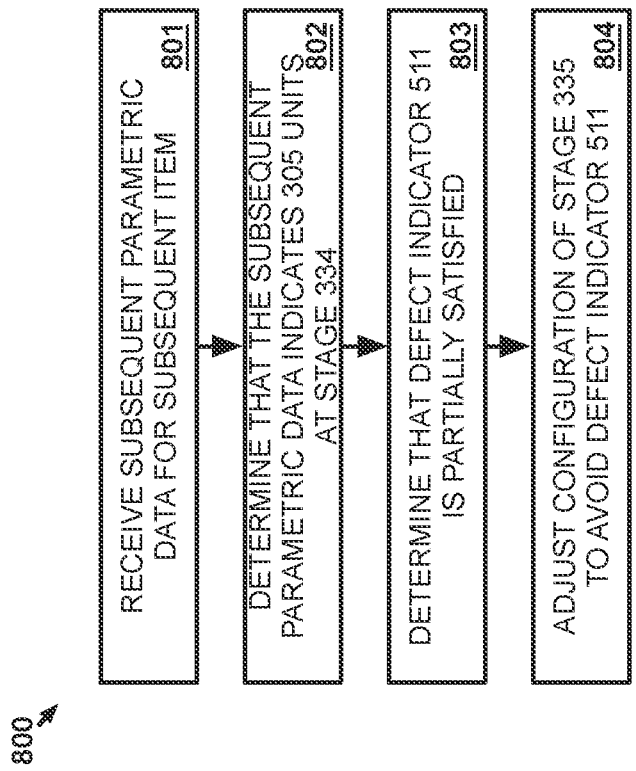
FIG. 8 illustrates an operational scenario for identifying defects during automated item production.

FIG. 8 illustrates operational scenario 800 for identifying defects during automated item production. In operational scenario 700, AI model 321 attempts to salvage a subsequent item in automated process 331 before the subsequent item becomes defective, as indicated by one of defect indicators 523. In this example, AI model 321 receives subsequent parametric data for the subsequent item at stage 332, stage 333, and stage 334 but not yet from stage 335 because the subsequent item has not reached or completed stage 335 (801). From the subsequent parametric data, AI model 321 determines that 305 units was measured for the subsequent item at stage 334 (802). Based on that measurement, AI model 321 determines that defect indicator 511 could potentially be satisfied if greater than 8.1 units is measured at stage 335 (803). Since the subsequent item has yet to complete stage 335, AI model 321 transfers instructions to stage 335 that adjust the configuration of stage 335 in an attempt to avoid a defect associated with defect indicator 511 for the subsequent item (804). For example, the configuration of stage 335 may be such that it accounts for tolerances that allow for measurements up to 8.5 units, but that configuration may be adjusted on an item by item basis. In this example, AI model 321 adjusts the configuration of stage 335 for the subsequent item to account for tolerances that only allow measurements less than 8.1 units. While there will still be a chance that stage 335 could operate sub-optimally and result in a measurement of greater than 8.1 units, the modified configuration for operating on the subsequent item will decrease the likelihood that the measurement will exceed 8.1 units and cause satisfaction of defect indicator 511.

Once stage 335 is completed for the subsequent data item, subsequent parametric data from stage 335 for the subsequent data item is transferred to AI model 321. AI model 321 checks that subsequent data item to see whether it measures greater than 8.1 units and, therefore, satisfies defect indicator 511. If defect indicator 511, and any other defect indicator that may now be satisfied upon receipt of the subsequent parametric data from stage 335, is not satisfied, then the subsequent item is allowed to proceed in automated process 331. Otherwise, AI model 321 will determine that there is a defect in the subsequent item despite re-configuring stage 335. AI model 321 may then perform as described in operational scenario 700 to remove the subsequent item form automated process 331.

In some examples, statistics may be maintained by automation defect system 301 about items determined to be defective based on defect indicators 523. The statistics may include information regarding how many defects are caused by each stage or combination of stages, measurements corresponding to those defects, frequency of defects, or other statistical information that may be relevant to adjusting automated process 331 to further reduce defective items—including combinations thereof. The statistics may be provided to user 341 via user device 307, so user 341 can determine whether adjustments to automated process 331 are needed, or automated defect system 301 may adjust automated process 331 itself. For example, the statistics may indicate that the situation concerning defect indicator 511, described in operational scenario 800 above, occurs far more often than defects related to defect indicator 512. Accordingly, automation defect system 301, user 341, or some other entity with access to the statistics, may determine to adjust the configuration of automation stage components 305 and/ or automation stage components 304 permanently to better avoid defects indicated by defect indicator 511.

Figure 9:
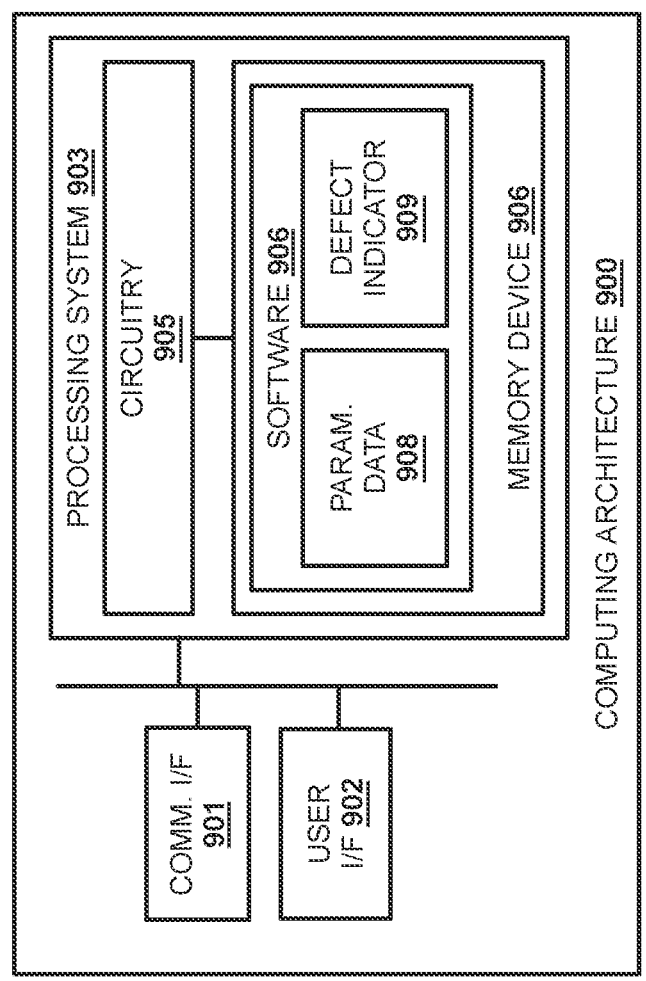
FIG. 9 illustrates an example computing architecture for identifying defects during automated item production.

FIG. 9 illustrates computing architecture 900 for identifying defects during automated item production. Computing architecture 900 is an example computing architecture for automation defect system 101, although alternative configurations may also be used. Computing architecture 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises processing circuitry, such as a microprocessor, and other circuitry that retrieves and executes operating software 907 from memory device 906. Memory device 906 comprises one or more computer readable storage media, such as a disk drive, flash drive, data storage circuitry, or some other memory apparatus that in no cases should be considered a mere propagated signal. Operating software 907 comprises computer programs, firmware, or some other form of machine-readable processing instructions. Operating software 907 includes parametric data module 908 and defect indicator module 909. Operating software 907 may further include an operating system, utilities, drivers, network interfaces, applications, or some other type of software. When executed by circuitry 905, operating software 907 directs processing system 903 to operate computing architecture 900 as described herein.

In particular, parametric data module 908 directs processing system 903 to identify a first defect in a first item, wherein the first defect is associated with a stage of production of the first produced item, and retrieve first parametric data associated with the stage for the first item. Defect indicator module 909 directs processing system 903 to process the first parametric data, along with additional parametric data associated with the stage for one or more other items having defects associated with the stage, to identify one or more defect indicators. Defect indicator module 909 further directs processing system 903 to monitor subsequent parametric data associated with the stage to recognize the one or more defect indicators in the subsequent parametric data.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A system for improving defect detection in an automated production process, the system comprising:
a memory that stores executable components;
a processor, operatively coupled to the memory, that executes the executable components, the executable components comprising:
an automation defect component configured to retrieve parametric data associated with multiple stages of the automated production process and wherein the parametric data indicates defective items associated with the multiple stages of the automated production process;
the automation defect component configured to provide the parametric data to a machine learning algorithm;
a machine learning component configured to generate, as output from the machine learning algorithm, common attributes for the defective items generated based on patterns identified in the parametric data wherein the common attributes identify measured values shared between the defective items;
the machine learning component configured to identify a set of the common attributes shared between the defective items is also shared between at least one non-defective item;
the machine learning component configured to modify the set of the common attributes shared between the defective items and the at least one non-defective item so the set of the common attributes is not shared between the defective items and the at least one non-defective item;
the machine learning component configured to generate defect indicators based on the common attributes wherein the common attributes comprise the modified set of common attributes; and
the automation defect component configured to monitor subsequent parametric data associated with the multiple stages of the automated production process to recognize the defect indicators.

2. The system of claim 1 wherein the common attributes comprise at least one of measurements, measurement combinations, thresholds, or measurement descriptions.

3. The system of claim 1 wherein the machine learning component is configured to generate common attributes between the defective items indicated by the parametric data comprises the machine learning component configured to determine one or more measurements, measurement combinations, thresholds, or measurement descriptions shared between the defective items indicated by the parametric data.

4. The system of claim 1 wherein machine learning component is configured to identify the set of the common attributes shared between the defective items and the at least one non-defective item comprises the machine learning component configured to determine one or more measurements, measurement combinations, thresholds, or measurement descriptions shared between at least one of the defective items and the at least one non-defective item.

5. The system of claim 1 wherein the machine learning component is configured to modify the set of the common attributes shared between the defective items and the at least one non-defective item comprises the machine learning component configured to modify one or more measurements, measurement combinations, thresholds, or measurement descriptions shared between at least one of the defective items and the at least one non-defective item.

6. The system of claim 1 wherein the machine learning component is configured to generate the defect indicators comprises the machine learning component configured to combine two or more of the common attributes into a single defect indicator.

7. The system of claim 1 wherein the machine learning component is configured to generate the defect indicators comprises the machine learning component configured to determine a confidence level that indicates a likelihood one or more of the defect indicators represents one of the defective items.

8. The system of claim 1 wherein the machine learning component is configured to generate the defect indicators comprises the machine learning component configured to determine a threshold that indicates a minimum amount of the defective items associated with one of the common attributes before the one of the common attributes can be included in the defect indicators.

9. The system of claim 1 wherein the machine learning component is configured to generate the defect indicators comprises the machine learning component configured to determine ones of the common attributes that affect other ones of the common attributes.

10. The system of claim 1 wherein the machine learning component is configured to generate the defect indicators comprises the machine learning component configured to determine ones of the common attributes that do not affect other ones of the common attributes.

11. A method for improving defect detection in an automated production process, the method comprising:
retrieving parametric data associated with multiple stages of the production process and wherein the parametric data indicates defective items associated with the multiple stages of the automated production process;
providing the parametric data to a machine learning algorithm;
generating, as output from the machine learning algorithm, common attributes for the defective items generated based on patterns identified in the parametric data wherein the common attributes identify measured values shared between the defective items;
identifying a set of the common attributes shared between the defective items is also shared between at least one non-defective item;
modifying the set of the common attributes shared between the defective items and the at least one non-defective item so the set of the common attributes is not shared between the defective items and the at least one non-defective item;
generating defect indicators based on the common attributes wherein the common attributes comprise the modified set of common attributes; and
monitoring subsequent parametric data associated with the multiple stages of the automated production process to recognize the defect indicators.

12. The method of claim 11 wherein the common attributes comprise at least one of measurements, measurement combinations, thresholds, or measurement descriptions.

13. The method of claim 11 wherein generating common attributes between the defective items indicated by the parametric data comprises determining one or more measurements, measurement combinations, thresholds, or measurement descriptions shared between the defective items indicated by the parametric data.

14. The method of claim 11 wherein identifying the set of the common attributes shared between the defective items and the at least one non-defective item comprises determining one or more measurements, measurement combinations, thresholds, or measurement descriptions shared between at least one of the defective items and the at least one non-defective item.

15. The method of claim 11 wherein modifying the set of the common attributes shared between the defective items and the at least one non-defective item comprises modifying one or more measurements, measurement combinations, thresholds, or measurement descriptions shared between at least one of the defective items and the at least one non-defective item.

16. The method of claim 11 wherein generating the defect indicators comprises combining two or more of the common attributes into a single defect indicator.

17. The method of claim 11 wherein generating the defect indicators comprises determining a confidence level that indicates a likelihood one or more of the defect indicators represents one of the defective items.

18. The method of claim 11 wherein generating the defect indicators comprises determining a threshold that indicates a minimum amount of the defective items associated with one of the common attributes before the one of the common attributes can be included in the defect indicators.

19. The method of claim 11 wherein generating the defect indicators comprises determining which ones of the common attributes that affect other ones of the common attributes.

20. A non-transitory computer-readable medium having stored thereon instructions for improving defect detection in an automated production process that, in response to execution, cause a system comprising a processor to perform operations, the operations comprising:
retrieving parametric data associated with multiple stages of the automated production process and wherein the parametric data indicates defective items associated with the multiple stages of the automated production process;
providing the parametric data to a machine learning algorithm;
generating, as output from the machine learning algorithm, common attributes for the defective items generated based on patterns identified in the parametric data wherein the common attributes identify measured values shared between the defective items;
identifying a set of the common attributes shared between the defective items is also shared between at least one non-defective item;
modifying the set of the common attributes shared between the defective items and the at least one non-defective item so the set of the common attributes is not shared between the defective items and the at least one non-defective item;
generating defect indicators based on the common attributes wherein the common attributes comprise the modified set of common attributes; and
monitoring subsequent parametric data associated with the multiple stages of the automated production process to recognize the defect indicators.

* * * * *